United States Patent [19]

Baus

[11] Patent Number: 4,807,948

[45] Date of Patent: Feb. 28, 1989

[54] CUPBOARD, MORE PARTICULARLY A BATHROOM CUPBOARD

[76] Inventor: Heinz G. Baus, Wartbodenstrasse 35, CH-3626 Hünibach-Thun, Switzerland

[21] Appl. No.: 162,899

[22] Filed: Mar. 2, 1988

[30] Foreign Application Priority Data

Mar. 5, 1987 [DE] Fed. Rep. of Germany ....... 3706997

[51] Int. Cl.$^4$ .............................................. A47B 43/00
[52] U.S. Cl. .................... 312/258; 312/140; 312/263; 220/80; 403/403; 403/402
[58] Field of Search .............. 312/258, 253, 140; 403/403, 402, 295; 220/62, 80, 73, 76

[56] References Cited

U.S. PATENT DOCUMENTS 3,315,834 4/1967 Nemlich .
3,454,187 7/1969 Rees ..................................... 220/73

FOREIGN PATENT DOCUMENTS 2830935 1/1980 Fed. Rep. of Germany .
8323941.3 11/1983 Fed. Rep. of Germany .
2359306 2/1978 France .
1522724 8/1978 United Kingdom ................ 403/295

Primary Examiner—Joseph Falk
Attorney, Agent, or Firm—Foley & Lardner, Schwartz, Jeffrey, Schwaab, Mack, Blumenthal & Evans

[57] ABSTRACT

A cupboard, more particularly a bathroom cupboard, contains a housing consisting of at least two profiled parts which are joined together in a corner-area at an angle of less than 180°. The purpose of the invention is to make it possible to build the cupboard at low production and assembly costs and without the use of corner connections. The profiled parts consist of a single initially straight profiled rail in which, for the purpose of producing the relevant corner-area, a cut is made from the outside. Located in the vicinity of the inside of the corner-area is a continuous strap which joins the profiled parts together, a clamping element being inserted into the gap obtained upon bending.

10 Claims, 1 Drawing Sheet

U.S. Patent   Feb. 28, 1989   4,807,948
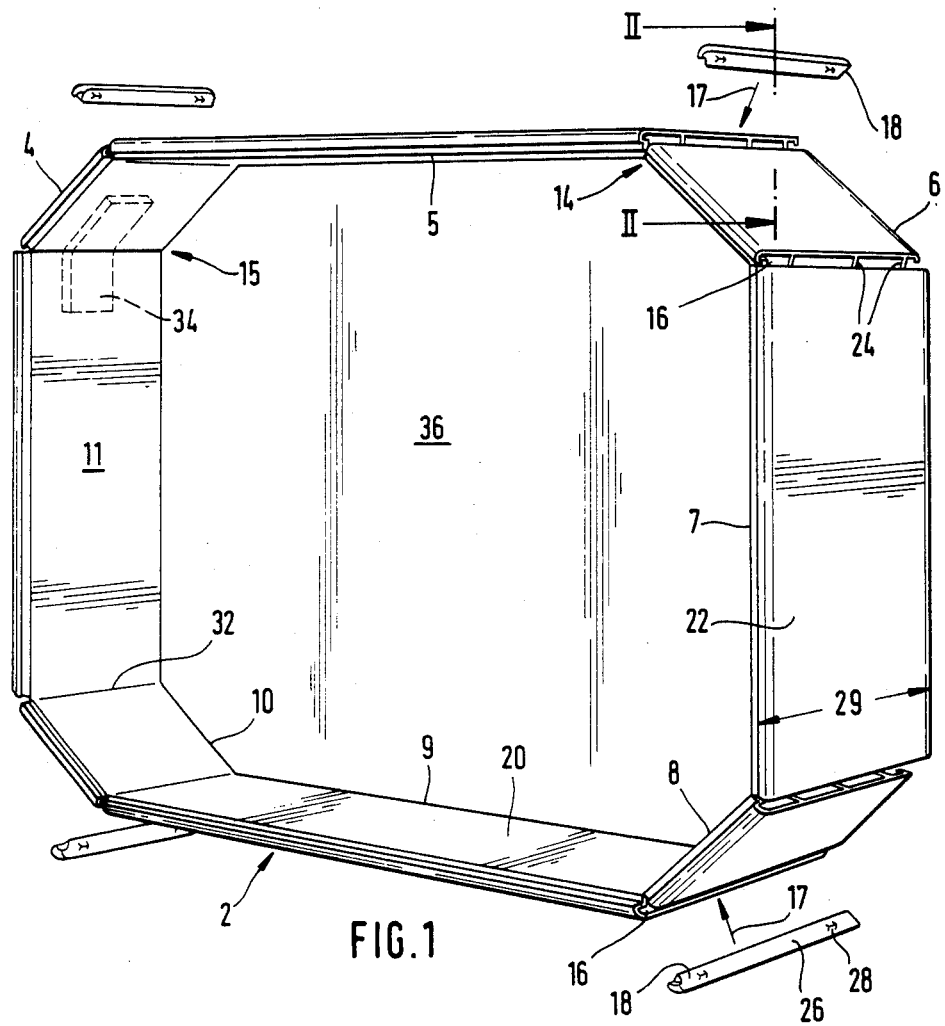
FIG. 1
FIG. 2
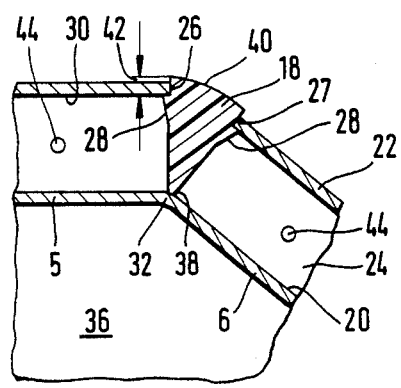
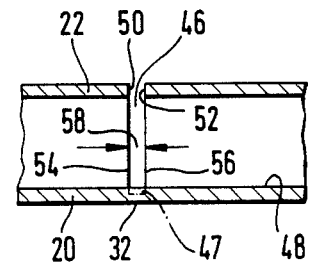
FIG. 3

CUPBOARD, MORE PARTICULARLY A BATHROOM CUPBOARD

BACKGROUND OF THE INVENTION

1. Field of the invention

The present invention relates to a cupboard, more particularly a bathroom cupboard, with a housing containing at least two profiled parts which are joined together in a corner area.

2. Description of the Prior Art

A cupboard of this kind is known from German Utility Model 83 23 941 according to which the housing or frame is made of a total of four drawn or extruded light-alloy sections which are connected together in the four corner-areas by means of corner-connections. Profiled parts of this kind are usually made of a hollow aluminum section which is produced in a practically endless process by drawing or extrusion and is then cut to the desired length. The profiled parts thus cut to length are then joined together again, as required, at right angles to each other, by means of corner-connections. The necessary production- and assembly-costs are not inconsiderable. A cupboard of this kind is particularly expensive to produce and assemble if the housing is not in the form of a rectangle with a total of four corner-areas, but has a multiple of four corners for the purpose of rounding it off or achieving a special design.

U.S. Pat. No. 3,515,834, discloses a frame, for example a drawer. This frame is made out of a profiled rail of substantially U-shaped cross-section and contains an externally visible decorative strip. For the purpose of producing the corners of the frame, triangular slots are made from the outside in the profiled rail and in the inserted strips. On the inside of each corner-area, the frame exhibits a continous slot with cut edges. On the outside, the bent parts of the frame are connected together only by relatively narrow webs, between which the decorative strip is arranged. A frame of this kind has relatively little torsional rigidity. Additional steps must be taken to improve the stability and the rigidity thereof.

German OS 28 30 935 describes structural elements made of flat panels. For the purpose of producing corner-areas, these panels are cut completely through and adhesive tapes are used to secure the parts of panels to the outside. The cut panels are then folded and are joined together at the desired angle by means of an adhesive. The stability of a structural element of this kind is determined mainly by the strength of the adhesive connection; after folding and gluing, the adhesive tapes, which also serve to protect the edges, are removed.

OBJECTS OF THE INVENTION

It is therefore an object of the invention to develop a cupboard of the type in question in such a manner that, while keeping production- and assembly-costs low, additional corner-connections can be dispensed with and an inexpensive structure can be obtained, even with a multiplicity of bends between the profiled parts. The cupboard is to possess satisfactory stability and high torsional rigidity. It is to be possible to obtain functional design with low material costs and light weight. Even with a large number of corners, the interior of the cupboard is to be as easy as possible to clean and there is to be no problem in meeting hygienic requirements, all the more so because the cupboard is intended for use preferably in a bath- or shower-room. The design is to be attractive and, in the case of housings or frames having more than four corners, structural costs are to be low. Above all, it is to be possible to design the cupboard as a mirrored cupboard, but shelved designs may also be provided, without sliding or pivoted mirrored doors at the front.

SUMMARY OF THE INVENTION

According to the present invention there is provided a cupboard, with a housing containing at least two profiled parts which are connected together in a corner-area, comprising:

a single initially straight profiled rail which for the purpose of producing said corner-area is provided with a cut made from an outer wall as for as an inner wall of the profiled rail, a strap provided on said inner wall of the profiled rail for connecting n a continuous manner said at least two profiled parts together, and a clamping element arranged in a gap obtained by bending said two profiled parts about said cut of said corner area, said gap being thus opened outwardly.

Therefore, the cupboard according to the invention is of simple design and is inexpensive to produce and assemble. Separate corner-connections comprising screws, studs, or the like are not needed since the profiled parts, arranged at the required angle to each other, consist of a single profiled rail. The profiled parts are not made by cutting completely through a profiled rail and then joining the parts together again by means of corner connections. Instead, at least one cut is made in the corner-area from the outside and, according to the invention, a strap, which connects the profiled parts together, remains inside the cupboard. The profiled rail is thereafter bent in such a manner that the individual parts thereof, obtained by making cuts assume the desired angular setting in relation to each other. As the cupboard is made from a single profiled rail, the terminal ends thereof are preferably connected together in a corner-area.

The inside of the housing or frame of the cupboard is completely closed, having only a single joint between the ends of the bent profiled rail. The profiled rail, which may be formed into a rectangle, or preferably polygon, has, as above indicated, ends which are preferably joined together by connecting elements or a corner-connection. In contrast to existing cupboards, however, a corner-connection of this kind is needed in only one corner-area. Since apart from the joint between the two ends of the profiled rail, the surface on the inside of the housing or frame of the cupboard is closed, it is easy to wipe and clean the cupboard. This is important, especially if the cupboard is to be used as a bathroom cupboard.

In each corner-area, the clamping element made in the form of a strip extends preferably over the entire width of the cupboard. Preferably, the clamping element, which is substantially triangular, lies with its wedge-surfaces bearing, under a preload, upon the end-surfaces of the outer wall. The clamping element, thus fitted under preload, serves reliably to stabilize the cupboard and improve its torsional rigidity. It should be noted that by making cuts in the corner areas, the torsional rigidity inherent in a hollow section is substantially reduced, since the closed contour is opened up and the continuity of the inner wall of the profiled rail is maintained only by the strap. The clamping element, introduced under preload into the wedge-shaped gap from the outside, reliably transfers compressive strains when acted upon by external forces. In addition to this, the preload ensures that the end-surfaces of the outer wall definitely bear against the wedge-surfaces of the clamping element, so that dirt cannot enter the cavities, nor can inadmissible relative movement take place between individual profiled parts.

Preferably the tip of the clamping element bears upon the inner wall under a preload. The clamping element thus has three-point support over the entire width of the cupboard, on the one hand through the tip and, on the other hand, through the wedge-surfaces, from the profiled rail or the profiled parts and this ensures satisfactory distribution and by passing of forces under load. Preferably, the bearing surfaces through which bracing is effected are relatively large in view of the thickness of the material of the outer wall and the width of the cupboard, thus avoiding inadmissible pressures per unit area.

Preferably, the clamping element or strip, on the one hand, is sufficiently strong and hard to transfer the preload forces and, on the other hand, is sufficiently resilient to allow the clamping element to be pressed reliably into the wedge-shaped gap in the relevant corner-area in spite of production tolerances, after which the resilient preload forces come into action.

Although production of the cupboard from a single profiled rail has been found particularly expedient, more than one profiled rail may be provided according to the invention, especially as a function of the overall dimensions of the cupboard, but this additional rail also requires the described cuts and strips in the corner-areas where the rail is provided with a continuous strap. Furthermore, it has been found particularly desirable for the corner-area cut to be produced by the countercutting process in order to avoid the formation of burrs in the area of the cut. According to this process, the forming of burrs is avoided by using three steps, namely cutting-out, countercutting and cutting-through with opposing working movements, thus eliminating the need for finishing the cut-surfaces. Before the profiled rail is bent, the cut-surfaces are substantially parallel with each other. After the bending, the corner-area comprises an approximately V-shaped gap extending over the entire depth of the cupboard from front to rear. Preferably, the wedge-shaped clamping element also extends over this depth which corresponds to the depth of the profiled rail.

Preferably, the profiled rail is in the form of a hollow section, the depth of the cut being determined in such a way that it be less than the thickness of the material of the whole profiled rail by an amount equal to the thickness of the material of the inner wall.

The inner wall may be lightly scored during the cutting operation in order to define accurately a bending zone for the hollow section; the depth of penetration of a score of this kind is predetermined as a function of the thickness of the material of the inner wall.

The profiled rail used according to the invention is made, in particular, of aluminum or an aluminum alloy, the surface-treatment being carried out, according to the invention, preferably after the cuts or countercuts for the corner-area have been made, after the bending operation, and after the ends have been joined. As a result of this procedure, reliable protection is assured in the corner-areas and damage to the anodizong or the coating of paint during bending is reliably avoided.

BRIEF DESCRIPTION OF THE DRAWINGS

A preferred embodiment will now be described hereinafter in greater detail as an example without limitative manner, having reference the attached drawings, wherein:

FIG. 1 is a perspective view of the cupboard;

FIG. 2 is a cross-section, to an enlarged scale along line II—II of FIG. 1; and

FIG. 3 shows the profiled rail of FIG. 2 prior to bending.

DESCRIPTION OF AN EXEMPLARY EMBODIMENT

FIG. 1 illustrates a cupboard for use as a bathroom cupboard. For the sake of simplicity, possible shelves or sliding or pivoted mirrored doors to be provided in front are not shown. The cupboard comprises a housing 2 which consists of a single profiled rail and has the external contour of an octagon. Altogether there are eight profiled parts 4 to 11 arranged in eight corner-areas 14 at angles of less than 180° to each other, as seen from the interior outwardly. Each corner-area contains a gap 16 which opens outwardly and into which a wedge-shaped clamping element 18 is to be inserted as indicated by arrows 17. For the sake of clarity, only one of the eight clamping elements 18 is shown. The profiled rail, and parts 4 to 11 thereof, is in the form of a hollow section comprising an inner wall 20 and an outer wall 22 joined together by partitions 24. Wedge-surfaces 26 of clamping elements 18 comprise locking elements 28 which, after a clamping element 18 has been inserted into a gap 16, engage behind the inner surface of outer wall 22, thus securing the clamping element 18 in the gap 16 between adjacent profiled parts.

The clamping element 18 extends substantially over the entire depth 29 of the cupboard. Each element is pressed into a gap 16 and bears, under preload, firmly against the cut-surfaces of the relevant profiled parts. The clamping element 18 is made of a synthetic material which is resiliently flexible but still possesses sufficient strength. The preload ensures that the cupboard substantially retains its shape under the action of external forces. Since the cuts in the corner-areas substantially reduce the rigidity of the hollow section, and only the connecting strap between the individual profiled parts, corresponding to the thickness of the material of the inner wall, is present, the clamping element 18 not only ensures satisfactory transfer of compressive forces, but also prevents inadmissibly extensive deformation. The preload is determined in such a manner that it is not completely eliminated by the expected tensile forces. Overall dimensional stability of the cupboard is thus assured.

Apart from the corner-area 15, in which the ends of profiled parts 4 and 11 constituting the profiled rail are joined together, inner wall 20 of the cupboard is completely closed in all other corner-areas and has no cut-edges or the like. Straps 32 extend in each corner-area 14 over the entire depth 20 of the cupboard and there are no cut-edges or the like in which dirt might collect or through which moisture or liquids could escape to the outside. Furthermore, the profiled rail, which apart from a single connecting corner-area 15, is completely closed around the entire periphery, makes cleaning and wiping the interior of the cupboard a simple matter.

It is essential that the inner wall of the cupboard be completely closed since inner walls 20 of profiled parts 4 to 11 are continuous and a connecting strap 32 is present in each corner-area 14. Only in corner-area 15, in which terminal profiles 4 and 11 abut, is there a joint. In contrast to existing cupboards, only terminal profiled parts 4 and 11 are joined together with a corner-connection 34. Arranged at the rear of the cupboard is a rear wall 36 which is secured to profiled parts 4 to 11 by means of screws or suitable fastening elements. The rear wall effectively stiffens the housing thus obtained. Since, according to the invention, wedge-shaped clamping elements 18 are clamped in eight gaps 16 in corner-areas 14,15, stiffening is provided in the vicinity of the gaps 18 whereby the stability and torsional rigidity of housing 2 is substantially improved.

FIG. 2 shows, to an enlarged scale, a cross-section of a corner-area in which locking elements 28, which may also be called locking lugs, are clearly visible. The locking elements 28 engage behind inner surface 30 of outer wall 22. Furthermore, tip 38 of each clamping element 18 bears, under preload, upon strap 32, thus ensuring firm seating of the said clamping element. Outer surface 40 thereof, which is preferably rounded, projects beyond outer wall 22 by a predeterminable amount 42, in practice between 0.5 and 1 mm. This projection beyond surface 40 is a surprisingly simple way of ensuring that any burrs formed in making the cuts for the corners-areas are covered and cannot endanger the user. This constitutes a significant production advantage, since accurate after-treatment of the cut-surfaces of the profiled rail is scarcely needed or could be carried out with substantially greater admissible tolerances. It will be seen that rear wall 36 is secured to rear partition 24 by means of screws 44.

Wedge-surfaces 26,27 of clamping elements 18 bear, under preload, upon relevant end-surfaces 50,52 of the outer walls 22 of the two profiled parts 5,6 (see FIG. 3). Bearing in the mind the thickness of the material of outer wall 20, and according to the depth of the cupboard, the bearing surfaces are relatively large, thus eliminating excessive pressures per unit of area. On the other hand, the preload ensures that wedge-surfaces 26,27 at all times bear firmly against the end-surfaces of the outer wall, even in the presence of tensile forces. This also provides the advantage that dirt and moisture cannot penetrate into the cavity located between inner wall 20 and outer wall 22, which is important in view of hygienic requirements, especially in the case of bathroom cup-boards. It will be seen that, in the corner-area, inner wall 20 of one profiled part 5 merges continuously, through strap 32, into the inner wall of the other profiled part 6. A completely closed inner wall is therefore present in the corner-area too and dirt and moisture cannot penetrate into the cavity between the inner an douter walls. This is in contrast to existing cupboards in which there are always cut-surfaces in the corners, allowing moisture or dirt to enter through small gaps. As a result of the closed inner surface, hygienic requirements are fully met and cleaning is no problem.

FIG. 3 shows profiled parts 5 and 6 prior to bending. A cut 46 has been made from outer wall 22 towards inner wall 20. This does not cut completely through the profiled rail, but extends only as far as inner side 48 of inner wall 20. This leaves a strap 32 which represents a continuous connection between the walls of the individual profiled parts. The depth of cut 46 may also be predetermined by producing a slight notch or score in area 47 of inner side 48, in order to prepare a specific bending line. After the profiled rail has been bent and clamping element 18 has been pressed-in, end-surfaces 50,52 of outer wall 22 bear firmly against the above-mentioned wedge-surfaces 26,27 of the clamping element 18, under preload. End-surfaces 50, 52, and parallel lateral surfaces 54,56 of cut 46, are at a constant distance 58 from each other, corresponding to the width of the cut. By means of a saw-blade in particular, cut 46 may be made in the profiled rail at little production cost. All the cuts 46 in the profiled rail are identical and the same distance 58 is maintained between opposing end-surfaces 50,52 and lateral surfaces 54,56.

After cuts 46 have been made according to the necessary lengths of the individual profiled parts, the continuous profiled rail, consisting of one piece, is bent as required. The surface-treatment is carried out only after terminal profiled parts 4 and 11 have been bent and joined together. Since the profiled rail is preferably made of aluminum or an aluminum alloy, anodizing is carried out after bending. The complete housing, bent as requried and also joined together at the ends by means of corner-connections, is anodized or subjected to a painting process.

Although the invention was described hereinabove with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A cupboard frame comprising a plurality of hollow profiled rail sections fabricated from a single profile rail with inner and outer walls of substantially rigid material, said rail sections being arranged in end to end relationship to define said frame and being defined by a plurality of transverse slots cut into said rail from the outside of said frame through said outer wall to said inner wall, said inner wall constituting a continuous web integrally connecting said rail sections, wherein said web is bent at each of said slots so that adjacent rail sections are disposed at an angle to each other and terminal ends of said rail are disposed contiguous to each other to form a closed frame with said web forming a continuous inside wall of said frame and with said slots opened to form gaps which converge toward said inner wall between adjacent end faces of said rail sections;

means for joining the contiguous terminal ends of said rail to each other; and a wedge-shaped connecting element arranged in each gap having converging side faces corresponding to the configuration of the gap, and at least one resilient locking element on each side face, said locking element being elastically deformable upon insertion of the connecting element into the gap, and wherein said locking element engages under the outer wall of the adjacent rail section without deforming or changing the position of the rail section and contacts said adjacent rail section only at said outer wall.

2. A cupboard frame according to claim 1, wherein the side faces of each connecting element converge to a point which is resiliently compressed against said web to bias the locking elements against the outer walls of the adjacent rail sections.

3. A cupboard frame according to claim 1, wherein said locking elements are spaced from the inner wall of the adjacent rail sections.

4. A cupboard frame according to claim 1, wherein said profiled rail is a hollow extruded aluminum or aluminum alloy rail.

5. A cupboard frame according to claim 1, comprising eight profiled rail sections arranged at substantially 135° angles to adjacent rail sections.

6. A cupboard frame according to claim 1, wherein said connecting elements have rounded outer faces which project outwardly of the outer walls of adjacent rail sections by a predetermined amount.

7. A cupboard frame according to claim 1, wherein a notch is cut into said inner wall at the base of each slot to define a bending zone for said web.

8. A cupboard frame according to claim 1, comprising parallel top and bottom rail sections, parallel side rail sections extending perpendicularly to said top and bottom sections, and inclined corner rail sections adjoining said top and bottom sections to said side sections.

9. A cupboard frame according to claim 8, wherein said inclined corner sections are shorter than said top and bottom sections and than said side sections.

10. A cupboard frame according to claim 1, wherein said connecting elements extend across the entire depth of said frame, and said locking elements extend across only a minor portion of the hollow interior of said rail sections.

* * * * *